United States Patent [19]

Siddall

[11] 3,728,378

[45] Apr. 17, 1973

[54] QUATERNARY ALKYL AROMATICS

[75] Inventor: John B. Siddall, Palo Alto, Calif.

[73] Assignee: Zoecon Corporation, Palo Alto, Calif.

[22] Filed: Apr. 28, 1970

[21] Appl. No.: 32,767

Related U.S. Application Data

[63] Continuation-in-part of Ser. No. 21,182, March 19, 1970, abandoned.

[52] U.S. Cl. ........260/476 R, 260/327 M, 260/340.9, 260/515 R, 260/592, 424/277, 424/278, 424/308, 424/317, 424/331

[51] Int. Cl. ........................C07c 63/06, C07c 69/78

[58] Field of Search ....................260/476 R, 515 R

[56] References Cited

UNITED STATES PATENTS 3,578,699   5/1971   Sorm et al. ...........................424/308

*Primary Examiner*—Lorraine A. Weinberger
*Assistant Examiner*—R. S. Weissberg
*Attorney*—Donald W. Erickson

[57] ABSTRACT

Quaternary alkylated aromatics prepared by alkylation of unsaturated bond using dialkylcopper lithium which are useful for control of insects.

15 Claims, No Drawings

QUATERNARY ALKYL AROMATICS

This is a continuation-in-part of application Ser. No. 21,182, filed Mar 19, 1970, now abandoned.

The present invention relates to novel quaternary alkyl compounds of the following formulas A, B and C and the use thereof and compositions thereof for the control of insects.

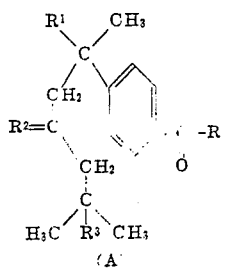

(A)

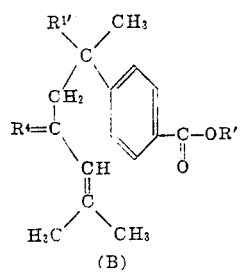

(B)

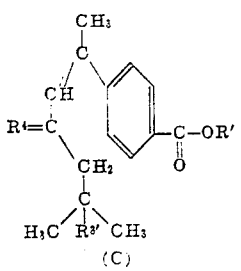

(C)

wherein,
R is alkyl, alkoxy, benzyloxy or hydroxy;
R' is alkyl or benzyl;
each of $R^1$ and $R^3$ is hydrogen or lower alkyl, provided that at least one $R^1$ and $R^3$ is lower alkyl;
$R^2$ is H,H or oxo and the cycloethylene ketal or cycloethylene thioketal thereof;
$R^4$ is oxo and the cycloethylene ketal or cycloethylene thioketal thereof; and each of $R^{1'}$ and $R^{3'}$ is lower alky.

The refers "alkyl", as used herein, refers to an alkyl group, branched or straight chain, having a chain length of one to six carbon atoms. The term "lower alkyl", as used herein, refers to a straight chain alkyl group of one to four carbon atoms. The term "alkoxy", as used herein, refers to a straight or branched chain alkoxy group having a chain length of one to six carbon atoms.

The compounds of the present invention are prepared according to the following outlined syntheses wherein $R^1$, $R^2$ and $R^3$ are as defined above and R' is alkyl or benzyl.

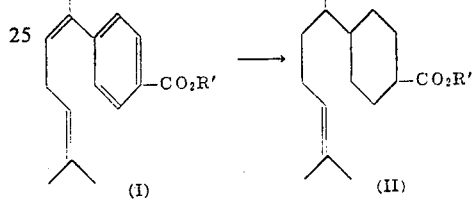

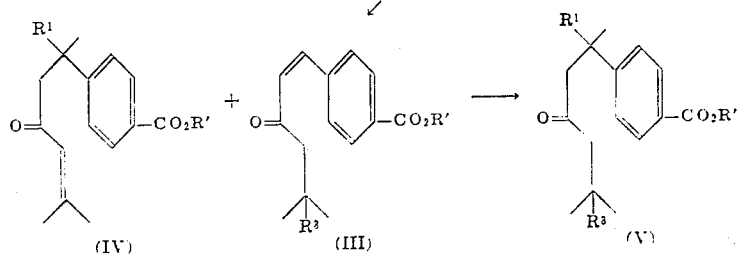

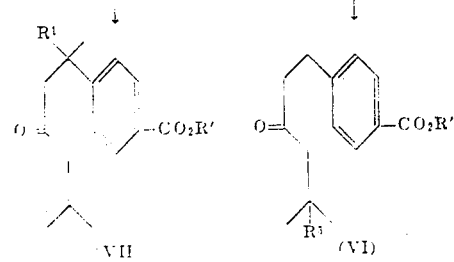

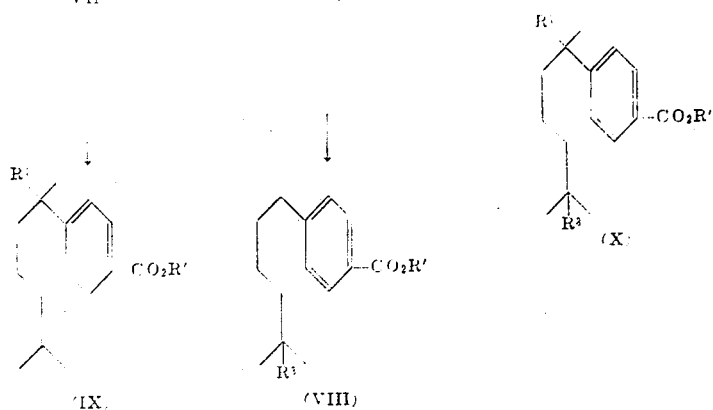

In the practice of the above-outlined syntheses, a compound of formula I is oxidized using chromiun trioxide in acetic acid, or the like, to yield the corresponding ketone (II) which is reacted with di (lower alkyl) copper lithium reagent to yield a mixture of compounds III and IV. The organo-copper reagent is prepared by the reaction of lower alkyl lithium with a cuprous salt, such as cuprous iodide at low temperature. A compound of formula III or IV or mixture thereof is alkylated using di(lower alkyl)copper lithium to yield V. Compounds III and IV are hydrogenated to the respective compounds VI and VII by catalytic hydrogenation using platinum oxide, or the like. The compounds VIII, IX and X are prepared by conversion of the carbonyl to the thioketal using ethane dithiol followed by treatment with Raney nickel. By treatment of the alkyl ester or benzyl ester with base, the corresponding free acids are obtained (A; R is hydroxy).

The compounds of formula A wherein R is alkyl are obtained by treating the acid (A; R is hydroxy) with alkyl lithium. Prior to carrying out this reaction, the carbonyl (A; $R^2$ is oxo) is converted to the corresponding lower cycloalkylene ketal using the corresponding glycol in the presence of acid catalyst and then, upon completion of the reaction, the ketal protecting group is removed by treatment with acid to regenerate the carbonyl group. Alternatively, the carbonyl group is reduced by treatment with sodium borohydride in aqueous ethanol, the acid converted to the keton (A; R is alkyl) and the hydroxy then oxidized back to the carbonyl using Jones reagent, maganese dioxide, chromium trioxide, or the like.

The compounds of formula I are described by Slama, Suchy and Sorm, *The Biological Bulletin* 134, No. 1, 154 (February, 1968) and Suchy, Slama and Sorm, *Science* 162, 582 (November 1, 1968).

The various esters of the present invention can be prepared by transesterification or by conversion of an ester, e.g. the methyl ether, to the acid and then to the acid chloride or acid bromide which, in treatment with the appropriate alcohol, affords the ester desired.

The compounds of the present invention are useful for the control of insects. The effectiveness of these compounds is attributed to their juvenile hormone activity. They are applied using liquid or solid carriers, and preferably, at a time so as to contact the immature insect during the embryo or larvae stage of the insect's life. The compounds of formula A are also effective against the adult female as a chemosterilant. The control of insects can be brought by such means as contact of the compound with the insect by direct topical contact, vapor contact, contact through ingestion, or transmittal from one insect to another through physical contact. For example, topical application, as by spraying, of a compound of the present invention to an insect during the egg or larvae stage effectively inhibits the passage of the insect to the next metamorphic stage. In some cases, complete inhibition is obtained and in other cases partial inhibition occurs resulting in an imperfect insect which is unable to reproduce. The compounds can be used at very low dosage levels of the order of 0.001 μg. to 5 μg. per insect. In the application of the compounds, the application can be such as to apply lower or higher dosages of the aforementioned range based on such factors as the estimated insect population, environmental conditions, locus of the insects and previous trials. The compounds of the present invention are selectively active control agents for Hemipteran, the family Pyrrhocoridae. They are particularly effective against Pyrrhocoris apterus and members of the genus Dysdercus, such as Dysdercus intermediates. Carriers, such as mineral and vegetable oils, e.g. refined kerosene, xylene, toluene, cottonseed oil, sesamol, and the like, and solid carriers, such as silica, talc, resins, synthetic polymers, can be used to dilute the active ingredient. Insect attractants or pheromones can also be included. Emulsifying agents and wetting agents can be used in formulations of the compounds of the present invention to assist in application.

The following examples are provided to illustrate the preparation of the novel compounds of the present invention and the practice of the present invention. Temperature in degrees Centigrade.

EXAMPLE 1

(A) A mixture of 5 g. of methyl p-(1,5-dimethylhexa-1,4-dienyl)benzoate, 1.5 molar equivalents of chromium trioxide dissolved in 3 ml. of water and 40 ml. of acetic acid is stirred at room temperature for about 2 hours and then quenched with isopropyl alcohol. The reaction mixture is then poured into water and extracted with ether. The combined ethereal extracts are washed with water and brine, dried and evaporated to yield methyl p-(1,5-dimethyl-3-oxohexa-1,4-dienyl)benzoate (II; R' is methyl) which is purified by chromatography on silica.

EXAMPLE 2

To a mixture of 1.3 g. of cuprous iodide and 50 ml. of dry ether under nitrogen, cooled to −10°, is added 8 ml. of 1.65M methyl lithium in ether. After negative Gilman test (about 15 minutes), 0.5 g. of methyl p-(1,5-dimethyl-3-oxohexa-1,4-dienyl)benzoate in ether is added while maintaining the temperature at about −10°. The reaction is worked up after afout 30 minutes by pouring into saturated ammonium chloride and extracting with ether. The combined ethereal extracts are washed with saturated ammonium chloride, water and brine, dried over sodium sulfate and evaporated to yield a mixture containing methyl p-(1,5,5-trimethyl-3-oxohexa-1-enyl)benzoate (III; R' = $R^3$ = methyl) and methyl p-(1,1,5-trimethyl-3-oxohexa-4-enyl)benzoate (IV; R' = $R^1$ = methyl) which are separated and purified by chromatography.

By repeating the process of this example using an equivalent amount of each of ethyl lithium and n-butyl lithium in place of methyl lithium, there is obtained methyl p-(1,5,5-trimethyl-3-oxohept-1-enyl)benzoate, methyl p-(1,5-dimethyl-1-ethyl-3-oxohex-4-enyl)benzoate, methyl p-(1,5,5-trimethyl-3-oxonon-1-enyl) and methyl p-(1,5-dimethyl-1-n-butyl-3-oxohex-4-enyl)benzoate. Similarly, by using n-propyl lithium, there is obtained methyl p-(1,5,5-trimethyl-3-oxooct-1-enyl)benzoate and methyl p-(1,5-dimethyl-1-n-propyl-3-oxohex-4-enyl)benzoate.

EXAMPLE 3

A solution of 2 g. of methyl p-(1,5,5-trimethyl-3-oxohex-1-enyl)benzoate in 20 ml. of ethanol 2.5 hydrogenated at room temperature and atmospheric pressure in the presence of 200 is mg. of platinum oxide with vigorous stirring until about 1.1 molar equivalents of hydrogen is absorbed. The system is flushed with nitrogen and the solution filtered through Celite and the filtrate evaporated to yield methyl p-(1,5,5-trimethyl-3-oxohexyl)benzoate (VI; $R' = R^3 =$ methyl).

By use of the foregoing process, each of the compounds obtained in Example 2 is hydrogenated to yield methyl p-(1,1,5-trimethyl-3-oxohexyl)benzoate, methyl p-(1,5,5-trimethyl-3-oxoheptyl)benzoate, methyl p-(1,5-dimethyl-1-ethyl-3-oxohyxyl)-benzoate, methyl p-(1,5,5-trimethyl-3-oxononyl)benzoate, methyl p-(1,5-dimethyl-1-n-butyl-3-oxohexyl)benzoate, methyl p-(1,5,5-trimethyl-3-oxooctyl)benzoate and methyl p-(1,5-dimethyl-1-n-propyl-3-oxohexyl)benzoate.

EXAMPLE 4

A solution of 5 g. of methyl p-(1,5,5-trimethyl-3-oxohexyl)benzoate (VI; $R' = R^3 =$ methyl) in 100 ml. glacial acetic acid containing 5 ml. of ethane dithiol and 4 ml. of a saturated solution of hydrogen chloride in acetic acid is allowed to stand at room temperature for 4 hours. Water is added and resulting mixture extracted with ethyl acetate. The combined extracts are washed with dilute aqueous sodium bicarbonate and water, dried over sodium sulfate and evaporated to dryness to yield crude cycloethylene thioketal of methyl p-(1,5,5-trimethyl-3-oxohexyl)benzoate which can be purified by chromatography. Four grams of the crude thioketal in 100 ml. of ethanol (previously distilled over Raney nickel) and 20 g. of degassed Raney nickel is heated at reflux for about 6 hours. Then the metal is removed by filtration and washed with hot ethanol and the filtrate concentrated by evaporation. The concentrate is taken up in chloroform, washed with dilute HCl, dilute sodium carbonate solution and water, dried over sodium sulfate and evaporated to yield methyl p-(1,5,5-trimethylhexyl)benzoate (VIII; $R' = R^3 =$ methyl) which is purified by chromatography.

By repeating the above process, each of the 3-oxo compounds is converted into the corresponding cycloethylene thioketal which is treated with Raney nickel to yield methyl p-(1,1,5-trimethylhexyl)benzoate, methyl p-(1,5,5-trimethylheptyl)benzoate, methyl p-(1,5-dimethyl-1-ethylhexyl)benzoate, methyl p-(1,5,5-trimethylnonyl)benzoate, methyl p-(1,5-dimethyl-1-n-butylhexyl)benzoate, methyl p-(1,5,5-trimethyloctyl)benzoate and methyl p-(1,5-dimethyl-1-n-propylhexyl)-benzoate.

EXAMPLE 5

(A) A mixture of 3 g. of methyl p-(1,5,5-trimethyl-3-oxohexyl)benzoate, 28 g. of 1,2-ethanediol, a few crystals of p-toluenesulfonic acid monohydrate and 100 ml. of dry benzene is heated under reflux for about 20 hours. After cooling, 0.2 ml. of pyridine is added and then ether. The mixture is washed with water and brine and the organic phase dried over sodium sulfate and evaporated under reduced pressure to yield methyl p-(1,5,5-trimethyl-3,3-ethylenedioxyhexyl)benzoate.

Using the above process, the cycloethylene ketal of the other 3-oxo compounds of Example 3 are prepared.

(B) A mixture of 1 g. of methyl p-(1,5,5-trimethyl-3,3-ethylenedioxyhexyl)benzoate, 60 ml. of methanol, 0.2 g. of sodium carbonate and 6 ml. of water is stirred at about 30° for 3 hours. The mixture is diluted with water, neutralized and then extracted with ether. The organic extracts are combined, washed with water, dried over sodium sulfate and evaporated to yield p-(1,5,5-trimethyl-3,3-ethylenedioxyhexyl)benzoic acid (A; R is hydroxyl, $R^1$ is hydrogen, $R^2$ is cycloethylenedioxy and $R^3$ is methyl).

By use of the above process, each of the esters of Part A is hydrolyzed to the corresponding acid, that is, p-(1,1,5-trimethyl-3,3-ethylenedioxyhexyl)benzoic acid, p-(1,5,5-trimethyl-3,3-ethylenedioxyheptyl)benzoic acid, p-(1,5-dimethyl-1-ethyl-3,3-ethylenedioxyhexyl)benzoic acid, p-(1,5,5-trimethyl-3,3-ehtylenedioxynonyl)benzoic acid, p-(1,5-diemthyl-1-n-butyl-3,3-ethylenedioxyhexyl)benzoic acid, p-(1,5,5-trimethyl-3,3-ethylenedioxyoctyl)benzoic acid and p-(1,5-dimethyl-1-n-propyl-3,3-ethylenedioxyhexyl)benzoic acid.

(C) To a stirred solution of 2.5 g. of p-(1,5,5-trimethyl-3,3-ethylenedioxyhexyl)benzoic acid in 30 ml of dry ether is added slowly, at 0°, 25 ml. of one molar solution of methyl lithium in ether. After about 3 hours at 20°, the mixture is poured into iced 1N acetic acid (100 ml.) with vigorous stirring. The ether layer is separated, combined with ethereal washings of the aqueous phase, dried with water, saturated potassium bicarbonate and then brine, dried over magnesium sulfate and evaporated under reduced pressure to yield the corresponding methyl ketone (A; R is methyl, $R^1$ is hydrogen, $R^2$ is cycloethylenedioxy and $R^3$ is methyl).

By repeating the above process using other alkyl lithiums, such as ethyl lithium in place of methyl lithium, the corresponding alkyl ketones are obtained, e.g. the ethyl ketone (A; R is ethyl, $R^1$ is hydrogen, $R^2$ is cycloethylenedioxy and $R^3$ is methyl).

(D) A mixture of 1 g. of the ethylene ketal of Part C, 40 ml. of acetic acid, 2.5 ml. of water and 0.5 ml. of concentrated surfuric acid is stirred at room temperature for about 2.5 hours. The mixture is then poured into water and extracted with ether. The combined ethereal extracts are washed with water, saturated potassium bicarbonate solution and brine. After drying over sodium sulfate, the solvent is removed by evaporation under reduced pressure to yield the corresponding ketone (A; R is methyl, $R^1$ is hydrogen, $R^2$ is oxo and $R^3$ is methyl).

Similarly, using the above process, the other cycloethylene ketals of Part C are converted into the corresponding 3-oxo compounds.

EXAMPLE 6

Thionyl chloride (1 g.) is added under stirring at room temperature to 0.5 g. of p-(1,5,5-trimethyl-3-oxohexyl)-benzoic acid and the resulting mixture heated with stirring and under dry conditions for about 15 minutes at 50°-70°. Excess thionyl chloride is removed by evaporation to yield the acid chloride. Anhydrous ethanol (one or more equivalents) is added and the resulting mixture heated under dry conditions at about 50° for 10-15 minutes. The excess ethanol is evaporated to yield ethyl p-(1,5,5-trimethyl-3-oxohexylbenzoate which is purified by chromatography.

By using other alcohols in place of ethanol in the foregoing process, such as t-butanol, n-propanol, benzyl alcohol, n-hexanol, and the like, the corresponding t-butyl ester, n-propyl ester, benzyl ester, n-hexyl ester, and the like, are obtained.

Using the procedure of Example 5(B) and the process of this examples, other esters of formulas III, IV and VI–IX are prepared via the acid and acid halide thereof.

EXAMPLE 7

The process of Example 5(B) is repeated using each of the esters of Example 4 to yield p-(1,5,5-trimethylhexyl)-benzoic acid, p-(1,1,5-trimethylhexyl)benzoic acid, p-(1,5-dimethyl-1-ethylhexyl)benzoic acid, p-(1,5,5-trimethylheptyl)-benzoic acid, p-(1,5-dimethyl-1-n-propylhexyl acid, p-(1,5,5-trimethyloct)benzoic acid, p-(1,5-dimethyl-1-n-butylhexyl)benzoic acid and p-(1,5,5-trimethylnonyl)benzoic acid.

The process of Example 5(C) is repeated using each of the above acids to yield the corresponding methyl ketone, that is, methyl 4-(1', 5', 5'-trimethylhexyl)phenyl ketone (A; R is methyl, $R^1$ is hydrogen, $R^2$ is H,H and $R^3$ is methyl), methyl 4-(1', 1', 5'-trimethylhexyl)phenyl ketone, methyl 4-(1',5'-dimethyl-1'-ethylhexyl)phenyl ketone, methyl 4-(1',5',5'-trimethylheptyl)phenyl ketone, methyl 4-(1',5'-dimethyl-1'-n-propylhexyl)phenyl ketone, methyl 4-(1',5',5'-trimethyloctyl)-phenyl ketone, methyl 4-(1',5'-dimethyl-1'-n-butylhexyl)phenyl ketone and methyl 4-(1',5', 5'-trimethylnonyl)phenyl ketone.

Similarly, through the use of other alkyl lithiums in the process of Example 5(C), such as ethyl lithium, n-hexyl lithium, neopentyl lithium, and the like, the corresponding ethyl phenyl ketone, n-hexyl phenyl ketone, neopentyl phenyl ketone, and the like, are obtained.

EXAMPLE 8

The process of Example 2 is repeated with the exceptions of using methyl p-(1,1,5-trimethyl-3-oxohex-4-enyl)-benzoate in place of methyl p-(1,5-dimethyl-3-oxohexa-1,4-dienyl)benzoate and the reaction mixture is worked up six hours after addition of the methyl benzoate to the dimethyl lithium cuprate reagent to yield methyl p-(1,1,5,5-tetramethyl-3-oxohexyl)benzoate (V; $R' = R^1 = R^3 =$ methyl). The same compound is prepared using methyl p-(1,5,5-trimethyl-3-oxohex-1-enyl)benzoate as the starting material. By this procedure, compounds of either formula III or IV are converted into the compounds of formula V. By formation of the ethylene thioketal of the compounds of formula V and desulfurization thereof with Raney nickel according to the procedure of Example 4, the corresponding compounds of formula V are prepared.

Alkyl phenyl ketones are prepared from the esters of formulas V and X using the methods of Examples 5 and 7 above.

Similarly, the procedure of Example 6 is utilized to prepare the acid halides and other esters of formulas V and X.

A liquid concentrate is prepared of 50 parts methyl p-(1,5,5-trimethyl-3-oxohexyl)benzoate and 50 parts xylene. The concentrate is then diluted with water and/or other organic liquid carriers together with wetting, dispersing or emulsifying agents, such as the alkyl or aralkyl sulfonates, sodium lauryl sulfate, alkylaryl polyether alcohols, polyethylene oxides and other surface-acetive agents. The concentration of methyl p-(1,5,5-trimethyl-3-oxohexyl)benzoate or other compounds of formula A in the dilution generally used for control of insects, such as Euryophthalmus convivus, Dysdercus albidiventris and Dysdercus mimus, is normally in the range of about 0.001 to 40 percent, usually 0.01 to 25 percent, depending upon such factors as the efficiency of the application apparatus and materials available. Concentrates can be formed using other carriers, such as kerosene, acetone, isopropyl alcohol, propylene glycol, cottonseed oil and toluene to contain from about 10–85 percent of the active ingredient. The concentrates are also used for preparing solid formulations in which case the concentrate, as is or diluted, is sprayed or mixed with solid carriers, such as kaolin, bentonite, talc, diatomaceous earth, pumice, silicas, granular polyvinyl chloride or other carriers. Wetting agents and other componets, such as paraffin wax or chlorinated paraffin can be added to control the rate of vaporization. The amount of active ingredient in conuunction with solid carrier is normally about the same as with liquid carriers.

EXAMPLE 9

Each of methyl p-(1,5,5-trimethyl-3-oxohex-1-enyl)-benzoate, methyl p-(1,1,5-trimethyl-3-oxohex-4-enyl)benzoate, methyl p-(1,5,5-trimethyl-3-oxohept-1-enyl)benzoate and methyl p-(1,5-dimethyl-1-ethyl-3-oxohex-4-enyl)benzoate is reacted with ethane dithiol using the procedure of Example 4 to yield the corresponding cycloethylene thioketal.

EXAMPLE 10

By use of the procedure of Example 5A, each of the 3-oxo compounds of Example 2 is converted into the corresponding cycloethylene ketal, e.g. methyl p-(1,5,5-trimethyl-3,3-ethylenedioxyhex-1-enyl)benzoate and methyl p-(1,1,5-trimethyl-3,3-ethylenedioxyhex-4-enyl)benzoate. Similarly, the 3-oxo compounds of formula V prepared as described in Example 8 are converted into the corresponding cycloethylene ketal and cyclolethylene thioketal using the procedures of Example 5A and Example 4, respectively.

What is claimed is:

1. A compound selected from those of the following formulas A, B and C:

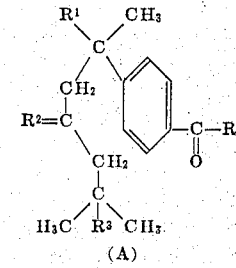
(A)

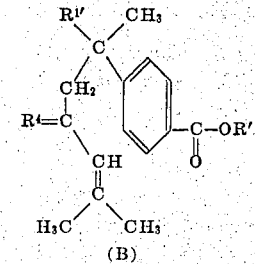
(B)

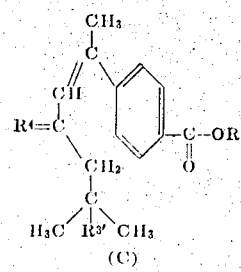
(C)

wherein,
R is alkoxy, benzyloxy or hydroxy;
R' is alkyl or benzyl;
each of $R^1$ and $R^3$ is hydrogen or lower alkyl, provided that at least one of $R^1$ and $R^3$ is lower alkyl;
$R^2$ is H,H or oxo;
$R^4$ is oxo; and each of $R^{1'}$ and $R^{3'}$ is lower alkyl.

2. A compound of formula A according to claim 1 wherein $R^1$ is hydrogen.

3. A compound according to claim 2 wherein R is alkoxy, and $R^3$ is methyl or ethyl.

4. A compound according to claim 3 wherein R is methoxy or ethoxy.

5. A compound according to claim 3 wherein $R^2$ is H,H.

6. A compound of formula A according to claim 1 wherein $R^3$ is hydrogen.

7. A compound according to claim 6 wherein R is alkoxy, and $R^1$ is methyl or ethyl.

8. A compound according to claim 7 wherein R is methoxy or ethoxy.

9. A compound according to claim 7 wherein $R^2$ is H,H.

10. A compound of the formula A according to claim 1 wherein each of $R^1$ and $R^3$ is lower alkyl.

11. A compound according to claim 10 wherein R is alkoxy.

12. A compound according to claim 11 wherein R is methoxy or ethoxy.

13. A compound according to claim 11 wherein $R^2$ is H,H.

14. A compound of formula B according to claim 1, wherein $R^{1'}$ is methyl or ethyl and R' is alkyl.

15. A compound of formula C according to claim 1 wherein $R^{3'}$ is methyl or ethyl and R' is alkyl.

* * * * *